US007787841B2

(12) United States Patent
Tsukio et al.

(10) Patent No.: US 7,787,841 B2
(45) Date of Patent: Aug. 31, 2010

(54) RECEIVING MODULE AND RECEIVING DEVICE USING THE SAME

(75) Inventors: Yasunobu Tsukio, Osaka (JP); Hiroaki Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 11/573,956

(22) PCT Filed: Jun. 5, 2006

(86) PCT No.: PCT/JP2006/011188

§ 371 (c)(1), (2), (4) Date: Feb. 20, 2007

(87) PCT Pub. No.: WO2006/134791

PCT Pub. Date: Dec. 21, 2006

(65) Prior Publication Data

US 2009/0029662 A1 Jan. 29, 2009

(30) Foreign Application Priority Data

Jun. 13, 2005 (JP) ............................ 2005-171984
Aug. 17, 2005 (JP) ............................ 2005-236271

(51) Int. Cl.
*H04B 17/02* (2006.01)

(52) U.S. Cl. ...................... 455/138; 455/132; 455/136; 455/250.1; 455/234.1; 375/347; 375/345

(58) Field of Classification Search ................ 455/138, 455/132, 136, 250.1, 234.1; 375/347, 345
See application file for complete search history.

(56) References Cited

U.S. PATENT DOCUMENTS

2003/0072397 A1* 4/2003 Kim et al. .................. 375/347

FOREIGN PATENT DOCUMENTS

| | | |
|---|---|---|
| JP | 7-162775 | 6/1995 |
| JP | 2004-135120 | 4/2004 |
| JP | 2004-274603 | 9/2004 |
| JP | 2005-27101 | 1/2005 |
| WO | 2004/095731 A1 | 11/2004 |

* cited by examiner

*Primary Examiner*—Sanh D Phu
(74) *Attorney, Agent, or Firm*—Pearne & Gordon LLP

(57) ABSTRACT

The demodulator in the receiving module of the invention supplies a signal produced based on a signal level detected by a first detector to a second amplifier as an amplification degree adjustment signal. With this arrangement, when a second receiver works, an AGC voltage supplied to the second receiver is already close to an ultimately converging certain value. The AGC voltage supplied to the second receiver is thus stabilized in its value, from the value close to the ultimately converging certain value to the certain value. Accordingly, a time period required from the second receiver starts working until the AGC voltage supplied to second amplifier ultimately converges into the certain value is shortened.

12 Claims, 4 Drawing Sheets

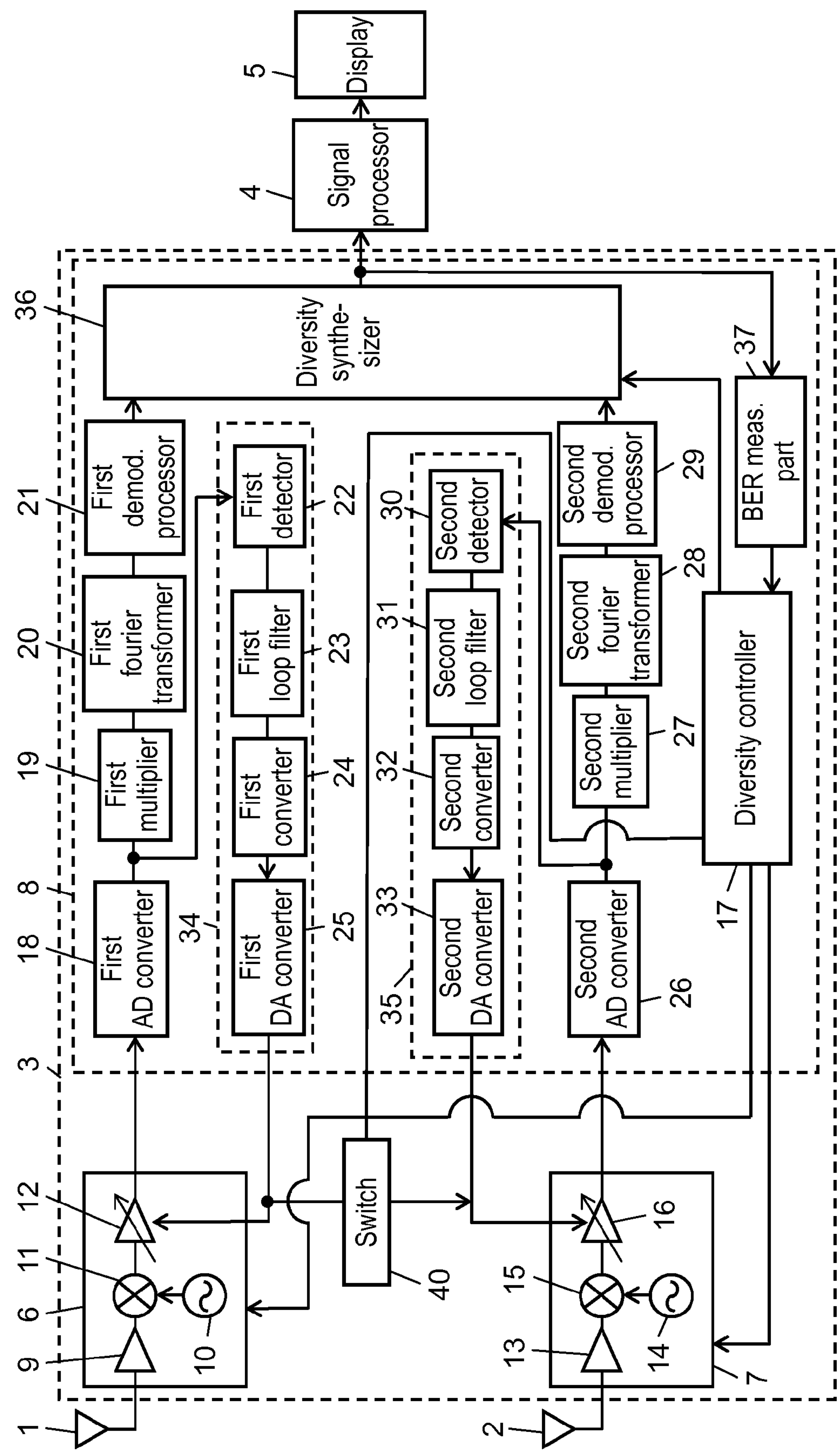
FIG. 3
Display
Signal processor
Diversity synthe-sizer
First demod. processor
First fourier transformer
First multiplier
First AD converter
First detector
First loop filter
First converter
First DA converter
Second detector
Second loop filter
Second converter
Second DA converter
Second demod. processor
Second fourier transformer
Second multiplier
Second AD converter
BER meas. part
Diversity controller
Switch

RECEIVING MODULE AND RECEIVING DEVICE USING THE SAME

This application is a U.S. National Phase Application of PCT International Application PCT/JP2006/311188.

TECHNICAL FIELD

The invention relates to a receiving module and a receiving unit using the receiving module.

BACKGROUND ART

Below, a conventional receiving module is explained with reference to FIG. 4.

FIG. 4 is a block diagram of a conventional receiver. In FIG. 4, receiving module 103 comprises first receiver 106 and second receiver 107 for making diversity reception, and demodulator 108 including demodulating LSI and being connected to an output side of first and second receivers 106 and 107. Demodulator 108 further includes first detector 122 for detecting a level of a signal from first receiver 106 and second detector 129 for detecting a level of a signal from second receiver 107. First receiver 106 further includes first amplifier 112 for amplifying an incoming signal with reference to an AGC (Automatic Gain Control) voltage produced based on the signal level detected by first detector 122. Second receiver 107 further includes second amplifier 116 for amplifying an incoming signal with reference to an AGC voltage produced based on a signal level detected by second detector 129.

As a document of prior art relating to application of this invention, Unexamined Japanese Patent Publication No. 2004-274603 is publicly known, as an example.

With conventional receiving module 103, when receiving status of the module is switched from a single reception (non-diversity reception) where only first receiver 106 receives a signal to a diversity reception where both first receiver 106 and second receiver 107 receive, and when difference between an initial AGC voltage value and a converging value thereof is large, the module requires a long period of time, a 100 millisecond for instance, from second receiver 107 starts working till the AGC voltage supplied to second amplifier 116 is ultimately converged into a certain value.

SUMMARY OF THE INVENTION

The invention solves above problem. It shortens a time period from the second receiver starts working until the AGC voltage supplied to the second amplifier is ultimately converged into a certain value.

For achieving above objective, a demodulator in the receiving module of the invention supplies a signal produced based on a signal level detected by a first detector to a second amplifier as an amplification degree adjustment signal.

With this arrangement, when the second receiver starts working, the AGC voltage supplied to the second receiver is already close to the ultimately converging certain value. The AGC voltage supplied to the second amplifier is thus being stabilized from the value already close to the ultimately converging certain value to the ultimately converging certain value. As a result, a time period required from second receiver 7 starts working till the AGC voltage supplied to second amplifier 16 is ultimately converged into the certain value is shortened.

BRIEF DESCRIPTION OF THE DRAWINGS

FIG. 3 is a block diagram of another receiving unit in accordance with the second exemplary embodiment of the invention.

REFERENCE MARKS IN THE DRAWINGS

Figure 1:
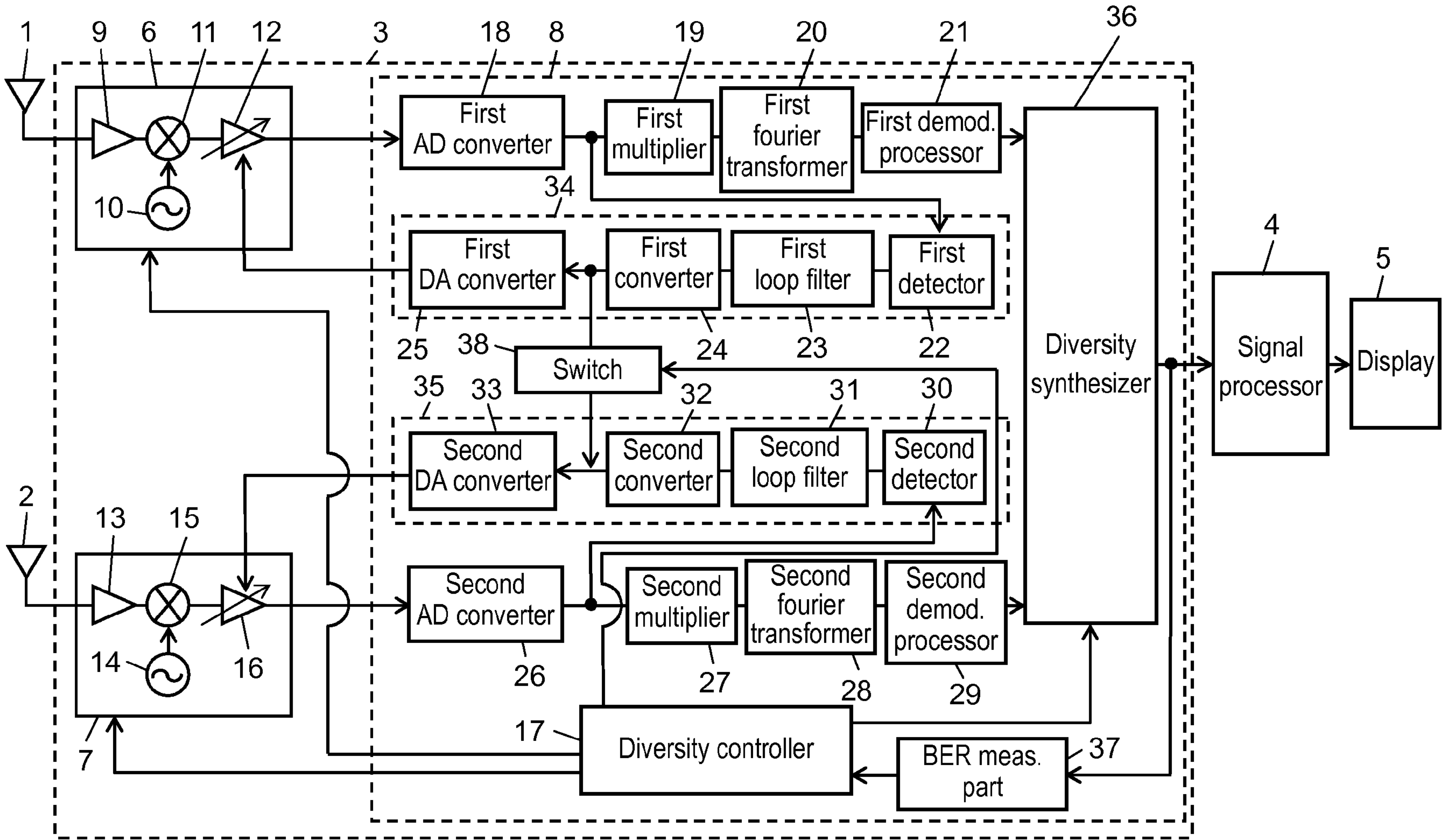
FIG. 1 is a block diagram of a receiving unit in accordance with a first exemplary embodiment of the invention.

1. first antenna
2. second antenna
3. receiving module
4. signal processor
5. display
6. first receiver
7. second receiver
8. demodulator

DETAILED DESCRIPTION OF PREFERRED EMBODIMENT

First Exemplary Embodiment

Following, a first exemplary embodiment of the invention is explained with reference to FIG. 1. FIG. 1 is a block diagram of a receiving unit in accordance with the first exemplary embodiment of the invention. In FIG. 1, the receiving unit comprises first antenna 1, second antenna 2, receiving module 3 connected to an output side of first antenna 1 and second antenna 2, signal processor 4 connected to an output side of receiving module 3, and display 5 connected to an output side of signal processor 4.

Receiving module 3 includes first receiver 6 and second receiver 7 each connected to first antenna 1 and second antenna 2 for making diversity reception, and demodulator 8 connected to an output side of first receiver 6 and second receiver 7.

First receiver 6 receives an outside signal caught by first antenna 1, a terrestrial broadcasting signal for instance. First receiver 6 includes first input filter (not illustrated) at an output side of first antenna 1 and first high-frequency amplifier 9 for amplifying a signal supplied by the first input filter. First receiver 6 also includes first local-oscillator 10 for generating a local oscillating signal, and first mixer 11 for mixing a signal from first high-frequency amplifier 9 with the local oscillating signal and frequency-converting the signal from first high-frequency amplifier 9. First receiver 6 further includes a first band-limiting filter (not illustrated) for suppressing an undesired frequency signal coming from first mixer 11 but for a desired frequency signal, and first amplifier 12 for amplifying a signal from the first band-limiting filter. First amplifier 12 determines amplification degree of the signal from the first band-limiting filter with reference to an AGC voltage provided by demodulator 8.

Similarly with above, second receiver 7 receives an outside signal caught by second antenna 2. Second receiver 7 includes a second input filter (not illustrated), second high-frequency amplifier 13, second local oscillator 14, second mixer 15, a second band-limiting filter (not illustrated) and second amplifier 16. Second amplifier 16 determines an amplification degree of a signal from the second band-limiting filter with reference to an AGC voltage provided by demodulator 8.

First receiver 6 and second receiver 7 are controlled by diversity controller 17 for making a single reception with one of the receivers or a diversity reception with both of the receivers.

Demodulator 8 includes first AD (Analog to Digital) converter 18 for converting an analog signal given by first receiver 6 into a digital signal. Demodulator 8 includes first multiplier 19 for converting the signal coming from first AD converter 18 into an orthogonally demodulated frequency division complex signal as well as converting a frequency of the same into a base band signal by eliminating a carrier component. Demodulator 8 further includes first Fourier transformer 20 for converting the base band OFDM signal supplied by first multiplier 19 from a data row in time domain to a data row in frequency domain. Demodulator 8 also includes first demodulation processor 21 for demodulating the signal from first Fourier transformer 20.

Demodulator 8 also includes first detector 22 for detecting a level of the signal from first AD converter 18. The level of the signal refers to an intensity of the signal. Demodulator 8 further includes first loop filter 23 for smoothing a level of variation of the signal coming from first detector 22, first converter 24 for converting the signal coming from first loop filter 23 into an AGC voltage value, and first DA (Digital to Analog) converter 25 for converting the digital AGC voltage value provided by first converter 24 into an analog AGC voltage value and supplying the analog AGC voltage to first amplifier 12 in the first receiver as an amplification degree adjustment signal.

Similarly, demodulator 8 includes second AD converter 26, second multiplier 27, second Fourier transformer 28 and second demodulation processor 29 disposed in this order. Demodulator 8 also includes second detector 30, second loop filter 31, second converter 32 and second DA converter 33 disposed in this order at an output side of second AD converter 26.

First detector 22, first loop filter 23, first converter 24 and first D A converter 25 constitute first AGC processor 34. Second detector 30, second loop filter 31, second converter 32 and second DA converter 33 constitute second AGC processor 35.

Demodulator 8 includes diversity synthesizer 36 for synthesizing a signal from first demodulation processor 21 and a signal from second demodulation processor 29 at a state of diversity reception. Demodulator 8 also includes diversity controller 17 controlling diversity synthesizer 36, first receiver 6 and second receiver 7, therewith switching receiving status of the receiver between single reception and diversity reception. Demodulator 8 also includes B.E.R. measuring part 37 for measuring a size of B.E.R. (Bit Error Rate) output by diversity synthesizer 36. Diversity controller 17 determines a receiving status of module 3, single reception or diversity reception, in response to the value of the B.E.R.

Demodulator 8 also includes switch 38 for supplying the AGC voltage value from first converter 24 to second DA converter 33 as an amplification degree adjustment signal with reference to the signal from diversity controller 17.

Next, performance of receiving module 3 is explained.

As an initial state, a single reception status is supposed where receiving module 3 receives an outside signal with only first receiver 6. With only first receiver 6 receiving the signal, and when B.E.R. value of the signal from first receiver 6 measured by B.E.R. measuring part 37 exceeds a predetermined value, diversity controller 17 of receiving module 3 switches receiving module 3 from the single reception status to a diversity reception status.

Diversity controller 17 then drives second receiver 7 as well as first receiver 6, and then making diversity synthesizer 36 synthesize the signal from first demodulation processor 21 with the signal from second demodulation processor 29. Diversity controller 17 also makes switch 38 supply the AGC voltage value from first converter 24 to second DA converter 33 as an amplification degree adjustment signal.

When receiving module 3 is installed in a compact receiving unit such as a portable phone, first antenna 1 and second antenna 2 are disposed closely each other. In this case, an AGC voltage supplied to first receiver 6 and an AGC voltage supplied to second receiver 7 are generally close. In this constitution, when second receiver 7 starts working, the AGC voltage supplied to second amplifier 16 is already close to a finally stabilizing certain value. The AGC voltage supplied to amplifier 16 is thus stabilized from the value close to the finally stabilizing certain value into the certain value. Consequently, a time period required from second receiver 7 starts working till the AGC voltage supplied to second amplifier 16 is ultimately converged into the certain value is reduced. Start of working of second receiver 7 can be defined either a timing when power is supplied to receiver 7 or a timing when a local oscillating signal of local oscillator 14 is set to a certain frequency value.

Second Exemplary Embodiment

Figure 2:
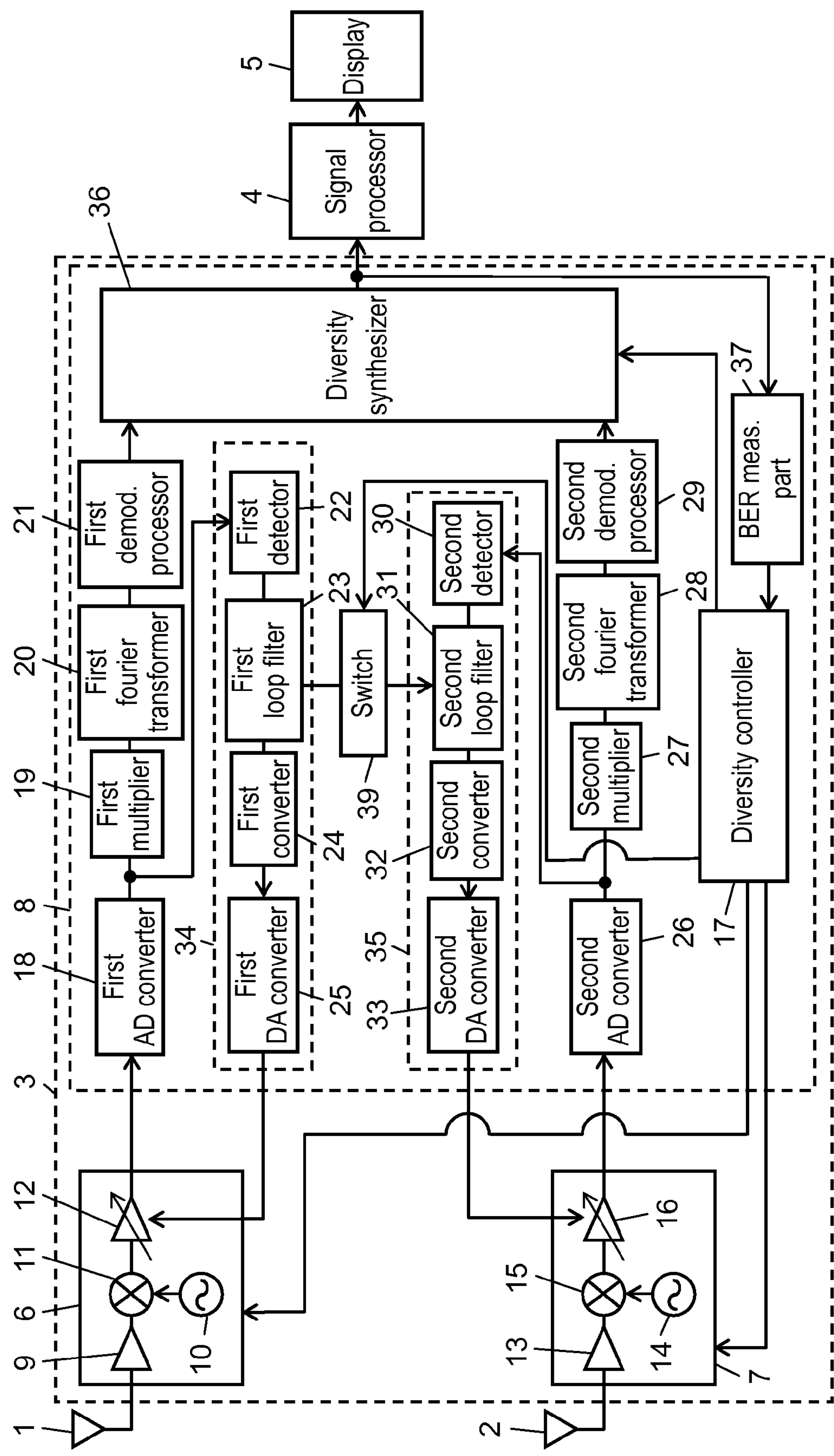
FIG. 2 is a block diagram of a receiving unit in accordance with a second exemplary embodiment of the invention.
Figure 4:
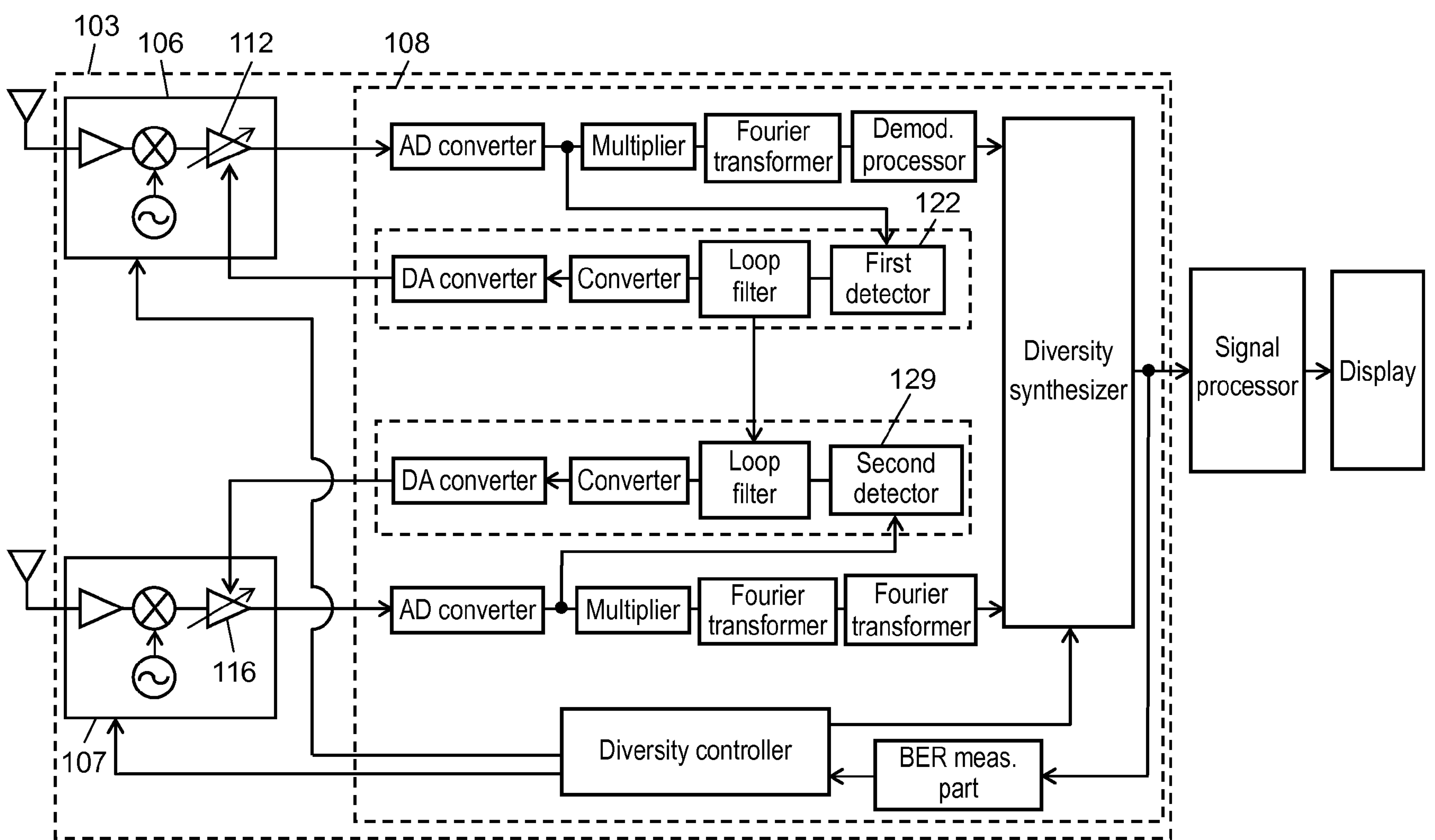
FIG. 4 is a block diagram of a conventional receiving unit.

Below, a receiving module and a receiving unit using the module in accordance with the second exemplary embodiment are explained with reference to FIG. 2. Unless otherwise specifically noted, it is identical with the first exemplary embodiment.

A different point of the second exemplary embodiment from the first exemplary embodiment is in location of switch 39. The switch is disposed between first loop filter 23 and second loop filter 31, as shown in FIG. 2.

Diversity controller 17, when switching receiving module 3 from a single reception status to a diversity reception status, makes switch 39 supply a signal level detected by the first detector through first loop filter 23 to second loop filter 31 as an amplification degree adjustment signal.

If performance is different between first-receiver 6 and second-receiver 7, there is a possibility that conversion characteristics become different between first converter 24 and second converter 32. By supplying second AGC processor 35 with the signal level detected by the first detector before converted by first converter 24, the AGC voltage value to be provided to second amplifier 16 becomes close to the finally stabilizing certain value, rather than supplying second AGC processor 35 with the AGC voltage converted by first converter 24. Accordingly, a time period required from second receiver 7 starts working till the AGC voltage supplied to second amplifier 16 is ultimately converged into the certain value is further shortened.

If the signal level detected by first detector 22 is supplied from first AGC processor 34 to second AGC processor 35 for only a short period of time, there is a possibility that the AGC voltage to be provided to second amplifier 16 is affected by an unstable signal from second detector 30. To avoid of such incident, switch 39 preferably supplies the signal level detected by first detector 22 to second AGC processor 35 for a certain period of time after second receiver 7 starts working. Therewith, the AGC voltage supplied to second amplifier 16 is less affected by the unstable signal from second detector 30. Consequently, the time period from second receiver 7 starts working till the AGC voltage supplied to second amplifier 16 is ultimately converged into the certain value is much securely shortened.

Switch 39 can supply the signal level detected by first detector 22 to second AGC processor 35 for a certain period of time before second receiver 7 is switched from a non-operating status to an operating status. Therewith, when second receiver 7 starts working, the signal level detected by first detector 22 is already supplied to second AGC processor 35, so a time loss of switch 39 when supplying the signal level detected by first detector 22 to second AGC processor 35 is reduced. Thus, the time period required from second receiver 7 starts working till the AGC voltage supplied to second amplifier 16 is ultimately converged into the certain value is further shortened.

In a case where receiving module 3 is installed in a small receiving unit such as a portable phone, first antenna 1 and second antenna 2 are disposed closely with each other, so that a variation in the signal level detected by first detector 22 and the level detected by second detector 30 are near. Therefore, switch 39 preferably supplies the varying signal level to second AGC processor 35 for a certain period of time in accordance with the variation level that first detector 22 detected. Consequently, the time period required from second receiver 7 starts working till the AGC voltage supplied to second amplifier 16 is ultimately converged into the certain value is further shortened.

Switch 39 can also supply second AGC processor 35 with a signal level detected by first detector 22 added by a certain amount of offset value as an amplification degree adjustment signal. If the signal level detected by first detector 22 is supplied straight to second AGC processor 35, there is a possibility the amplification degree of second amplifier 16 becomes too short relative to the signal level second antenna 2 receives, that is the amplification degree of the signal to be supplied to the second AD converter becomes too small, deteriorating a receiving performance. However, by supplying a signal level detected by detector 22 added by the certain amount of negative offset value to second amplifier 16, probability of deterioration in performance of the signal output of second amplifier 16 is reduced.

Optimal amount of the offset value can vary depending on receiving environment such as a multi-pass reception and a mobile reception. But, an adequate value can be set by making the amount externally settable. For instance, an electronic volume control (not illustrated) can be installed in second amplifier 16 and a terminal for controlling the volume control can be installed in a receiving unit. Upon necessity, the terminal can be connected to a computer for receiving an appropriate offset amount.

Demodulator 8 can further include a level correlation coefficient calculator (not illustrated) for calculating a correlation coefficient between the two signal levels detected by first detector 22 and second detector 30. The correlation coefficient is a value indicating an intensity of varying degree of the two signal levels. When fluctuation in one signal is independent from the other, correlation coefficient is 0. As the mutual dependency becomes stronger, the closer becomes the absolute value of correlation coefficient to 1. When an absolute value of the correlation coefficient calculated by the correlation coefficient calculator exceeds a certain threshold value, it is considered two fluctuation levels are correlated and both are close to an AGC optimal value. At this moment, switch 39 supplies the variation level detected by first detector 22 to second AGC processor 35. Therewith, the time period required from second receiver 7 starts working till the AGC voltage supplied to second amplifier 16 is ultimately converged into the certain value is more securely shortened.

When directivity of two antennas is different, the correlation coefficient becomes different depending on an environment of signal reception. An adequate control can still be realized by making the threshold value of the correlation coefficient externally settable. For example, an electronic volume control (not illustrated) and a terminal for controlling the volume control can be installed in a receiving unit. By connecting the terminal to a computer, a threshold value of the correlation coefficient can be appropriately established.

Switch 40 can be installed outside a demodulator LSI, or demodulator 8, as shown in FIG. 3. As an example, analog type switch 40 can be installed between an output side of first DA converter 25 and an input side of second amplifier 16.

INDUSTRIAL APPLICABILITY

The receiving module of the invention is switchable from a single reception status to a diversity reception status shortly and smoothly, so that the module can be conveniently used for a portable phone and the like.

The invention claimed is:

1. A receiving module comprising:

a first receiver and a second receiver for making a diversity reception;

a first detector for detecting a level of a signal from the first receiver; and a second detector for detecting a level of a signal from the second receiver;

wherein the first receiver includes a first amplifier for amplifying an incoming signal with reference to a signal from the first detector, wherein the second receiver includes a second amplifier for amplifying an incoming signal with reference to a signal from the second detector, and wherein a signal produced based on a level detected by the first detector is supplied to the second amplifier for a certain period of time as an amplification degree adjustment signal, wherein the certain period of time is referred to a time period counted from when the second receiver starts working.

2. A receiving module comprising:

a first receiver and a second receiver for making a diversity reception;

a demodulator connected to an output side of the first receiver and the second receiver;

wherein the demodulator includes a first detector for detecting a signal level from the first receiver and a second detector for detecting a signal level from the second receiver, wherein the first receiver includes a first amplifier for amplifying an incoming signal with reference to a signal from the first detector, wherein the second receiver includes a second amplifier for amplifying an incoming signal with reference to a signal from the second detector, and wherein the demodulator supplies for a certain period of time a signal produced based on a level detected by the first detector to the second amplifier as an amplification degree adjustment signal, wherein the certain period of time is referred to a time period counted from when the second receiver starts working.

3. The receiving module of claim 2, wherein the demodulator includes a first converter for converting the signal from the first detector and a second converter for converting the signal from the second detector, and wherein the demodulator supplies a signal produced based on the level detected by the first detector but before converted by the first converter to the second converter.

4. The receiving module of claim 1, wherein the certain period of time is referred to a time period counted from before the second receiver is switched from a non-operating status to an operating status.

5. The receiving module of claim 2, wherein the demodulator supplies for a certain period of time the signal produced based on the level detected by the first detector to the second amplifier in accordance with a variation level the first detector detected.

6. The receiving module of claim 1, wherein the signal produced based on the level is referred to be a signal level detected by the first detector and added by a certain amount of offset value.

7. The receiving module of claim 6, wherein the certain amount of offset value is externally settable.

8. The receiving module of claim 2, further comprising a level correlation coefficient calculator for calculating a correlation coefficient between the signal level detected by the first detector and the signal level detected by the second detector, wherein, when a correlation coefficient calculated by the level correlation coefficient calculator exceeds a certain threshold value, the demodulator supplies the signal produced based on the level detected by the first detector to the second amplifier as an amplification degree adjustment signal.

9. The receiving module of claim 8, wherein the certain threshold value is externally settable.

10. A receiving unit comprising:

a first antenna;

a second antenna;

a first receiver connected to the first antenna for making a diversity reception;

a second receiver connected to the second antenna for making a diversity reception;

a demodulator connected to an output side of the first receiver and an output side of the second receiver;

a signal processor connected to an output side of the demodulator; and a display connected to an output side of the signal processor, wherein the demodulator includes a first detector for detecting a level of a signal from the first receiver and a second detector for detecting a level of a signal from the second receiver, wherein the first receiver includes a first amplifier for amplifying an incoming signal with reference to a signal from the first detector, wherein the second receiver includes a second amplifier for amplifying an incoming signal with reference to a signal from the second detector, and wherein the demodulator supplies for a certain period of time a signal produced based on a level detected by the first detector to the second amplifier as an amplification degree adjustment signal, wherein the certain period of time is referred to a time period counted from when the second receiver starts working.

11. The receiving module of claim 1, wherein the signal produced based on the level is referred to be a signal level detected by the first detector and added by a certain amount of offset value.

12. The receiving module of claim 11, wherein the certain amount of offset value is externally settable.

* * * * *

UNITED STATES PATENT AND TRADEMARK OFFICE

CERTIFICATE OF CORRECTION

PATENT NO. : 7,787,841 B2
APPLICATION NO. : 11/573956
DATED : August 31, 2010
INVENTOR(S) : Tsukio et al.

It is certified that error appears in the above-identified patent and that said Letters Patent is hereby corrected as shown below:

On the Title page, please correct the PCT No. to reflect "PCT/JP2006/311188"

Signed and Sealed this
Twenty-eighth Day of December, 2010

David J. Kappos
*Director of the United States Patent and Trademark Office*